M. DE PEZZER.
INDICATING DEVICE FOR PHONOGRAPHY AND ITS APPLICATION.
APPLICATION FILED JUNE 15, 1909.

1,101,326.  Patented June 23, 1914.
7 SHEETS—SHEET 3.

WITNESSES:

INVENTOR:
MICHEL de PEZZER.
BY
ATTORNEYS

M. DE PEZZER.
INDICATING DEVICE FOR PHONOGRAPHY AND ITS APPLICATION.
APPLICATION FILED JUNE 15, 1909.

1,101,326.

Patented June 23, 1914.

WITNESSES:

INVENTOR
MICHEL de PEZZER.
By Rosenbaum & Stockbridge
ATTORNEYS

M. DE PEZZER.
INDICATING DEVICE FOR PHONOGRAPHY AND ITS APPLICATION.
APPLICATION FILED JUNE 15, 1909.

1,101,326.

Patented June 23, 1914.

WITNESSES:

INVENTOR:
MICHEL de PEZZER

ATTORNEYS.

M. DE PEZZER.
INDICATING DEVICE FOR PHONOGRAPHY AND ITS APPLICATION.
APPLICATION FILED JUNE 15, 1909.

1,101,326.

Patented June 23, 1914.
7 SHEETS—SHEET 7.

WITNESSES:

INVENTOR.
MICHEL de PEZZER

ATTORNEYS

UNITED STATES PATENT OFFICE.

MICHEL DE PEZZER, OF PARIS, FRANCE.

INDICATING DEVICE FOR PHONOGRAPHY AND ITS APPLICATION.

1,101,326.  Specification of Letters Patent. Patented June 23, 1914.

Application filed June 15, 1909. Serial No. 502,274.

*To all whom it may concern:*

Be it known that I, MICHEL DE PEZZER, a citizen of the French Republic, residing at Paris, in the Department of the Seine, France, have invented certain new and useful Improvements in Indicating Devices for Phonography and Their Application, of which the following is a specification.

This invention refers to an indicating arrangement which permits of following by reading the ordinary emissions of a phonograph simultaneously with the production of the said sounds.

With this object in view, the essential element of the indicating device consists of a flexible band unwound by clock-work and inscribed with the various parts of the piece to be performed, for example, the song, the words and the accompaniment. On this band the music or the words are not written as is usual with scores, that is to say, that instead of the space existing between the various bars depending on the number of signs to be arranged between the said bars, this inscription solely depends on the period of time occupied in executing the sounds or syllables inclosed between two consecutive bars. In other words, when the band is unwound, the various musical signs, or the various syllables of the words, pass (before a fixed pointer, for example) exactly according to the various alterations of speed imparted to the whole according to the expression it is desired to impart. It can consequently be understood that by following the unwinding of the indicating band, the performers, for example, the singer and the accompanist, are guided in the execution of their respective parts, so as to be always together, and any hesitancy or inaccuracy in the execution is thereby avoided. Whatever the case may be, the indicating band will generally comprise one or more lines referring to the melodious part or to the declamatory part, and one or more other lines referring to the accompaniment. In order practically to carry out the special rhythmic and expressive inscription referred to above, and at the same time to obtain agreement between the various parts, for the production of the band, it will be necessary to employ an arrangement for inscribing the rhythm, which arrangement is described farther on. The indicator, formed in the manner just described, is capable of various applications, either alone or in combination with other musical apparatus, more particularly the phonograph. In this latter case, by separately recording the song and the accompaniment, it permits the singer being accompanied by the phonograph, or, an accompanist to accompany a song by the phonograph.

I shall now describe my invention with reference to the accompanying drawings, showing the musical indicator referred to above as applied to a gramophone, and provided with the special arrangement for the production of the rhythmic bands of the indicator.

Figs. 17 to 21 show another modification of the desk, in which Fig. 17 is a plan view, Fig. 18 a longitudinal section on Y—Y of Fig. 17, Fig. 19 an elevation showing the mechanism for actuating the engaging and disengaging gear, Fig. 20 showing a cross section of the desk as fitted to the phonograph.

Figure 1:
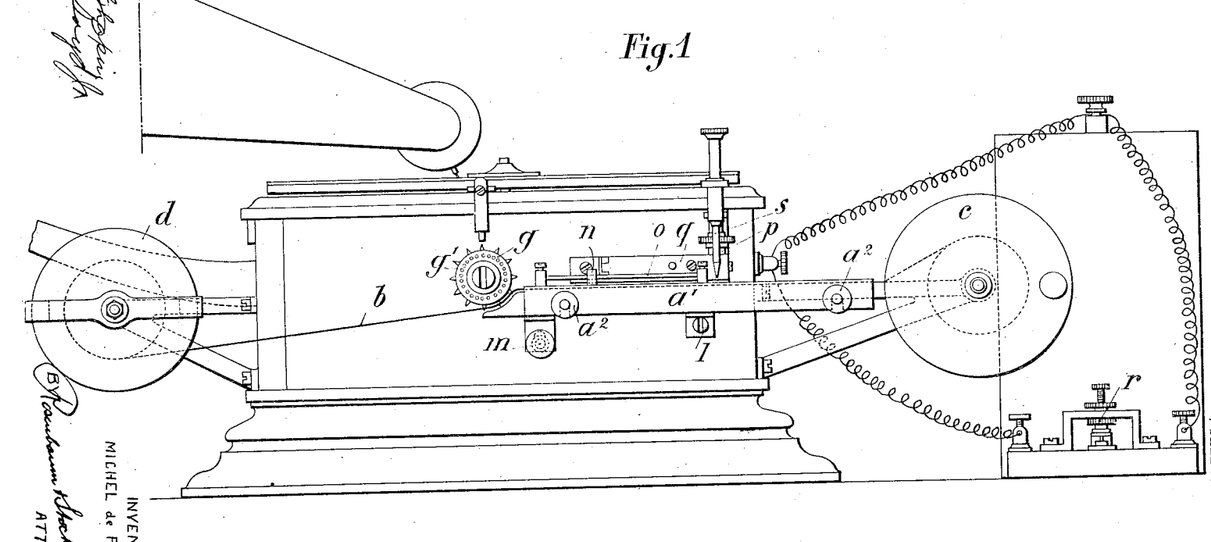
Figure 1 is an elevation of the whole arrangement.
Figure 2:
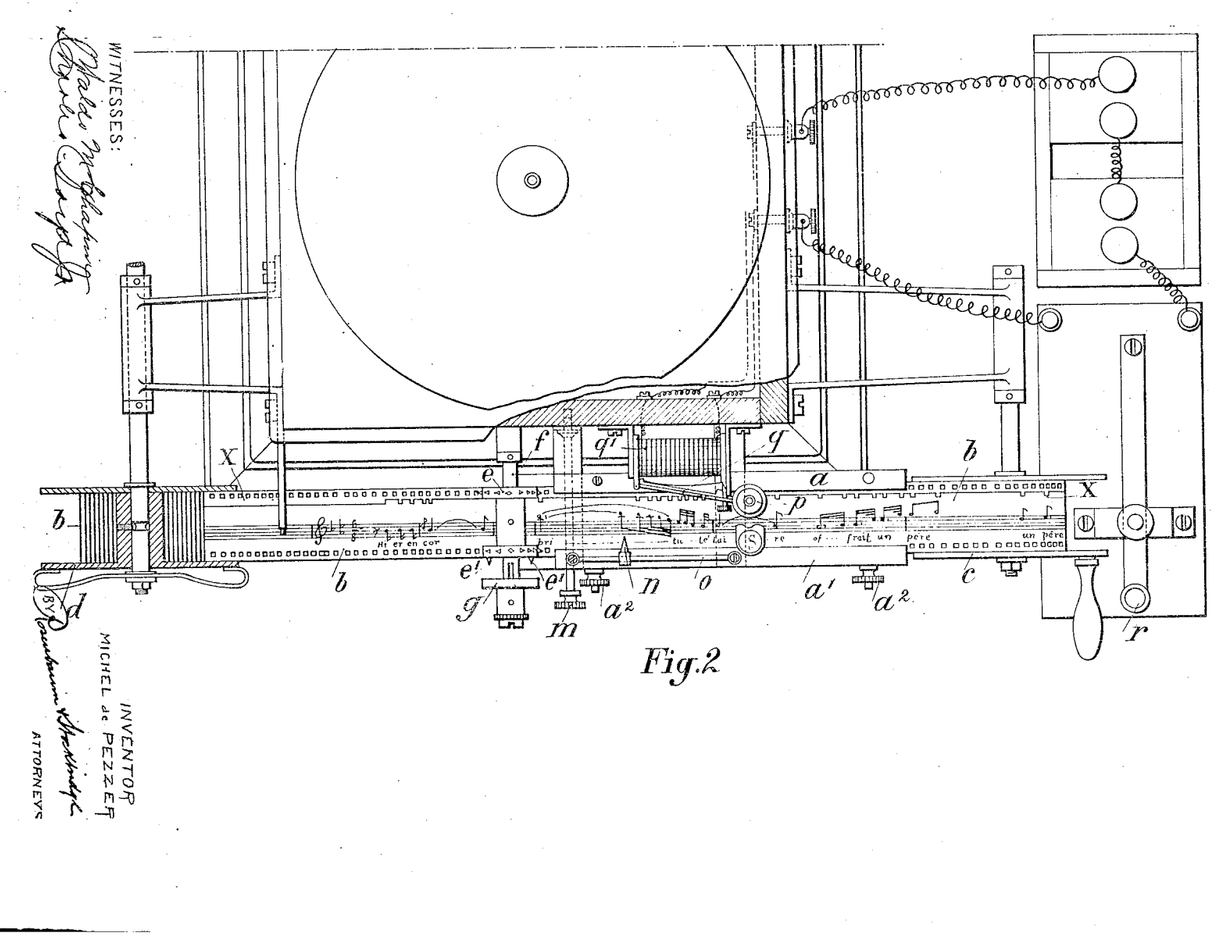
Fig. 2 is a corresponding plan view.
Figure 3:
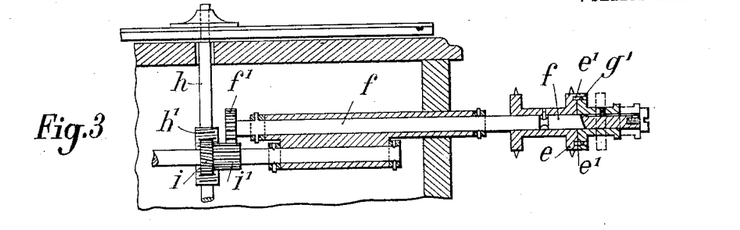
Fig. 3 is a detail showing the actuating mechanism of the rhythmic band.
Figure 8:
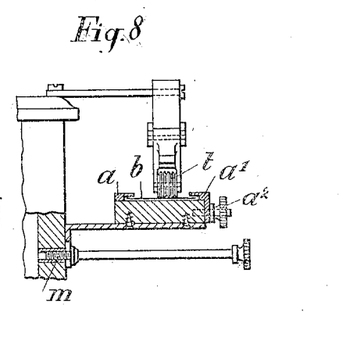

The arrangement shown in Figs. 1 to 3 comprises a guide ($a$) in which is passed the rhythmic indicating band ($b$); one of the sides ($a'$) of this guide is movable so as to permit of rapidly inserting and removing the band ($b$); this movable side ($a'$) is held in position on the guide ($a$) by milled screws ($a^2$) (Figs. 1, 2 and 8). The band ($b$) is unrolled from a stock reel ($c$) on to a receiving reel ($d$). This unrolling movement of the band ($b$) is controlled by a double pin-wheel ($e$) fitted loose to a shaft ($f$) which is rotated and at the desired moment rotates the pin-wheel ($e$) by the intermediation of a coupling disk ($g$). This disk ($g$) can slide along the shaft ($f$) but is always carried around on the rotation of the latter. The inner surface of the disk ($g$) is provided with slots or recesses ($g'$), which are for the purpose of meshing with projections ($e'$) provided on the adjacent surface of the pin-wheel ($e$) (Figs. 2 and 3).

The shaft ($f$) is rotated by clock-work or in any other suitable manner. For the case in which the indicating band is fitted to a phonographic apparatus, as in the example shown in the drawings, the shaft ($f$) would be rotated by the driving shaft ($h$) of the phonograph, by the intermediation of any suitable transmission whatever; for example, the shaft ($h$) may be provided with a worm ($h'$) meshing with a worm-wheel ($i$), fixed to a pinion ($i'$) which latter meshes with a cog-wheel ($f'$) keyed to the shaft ($f$).

Figure 4:
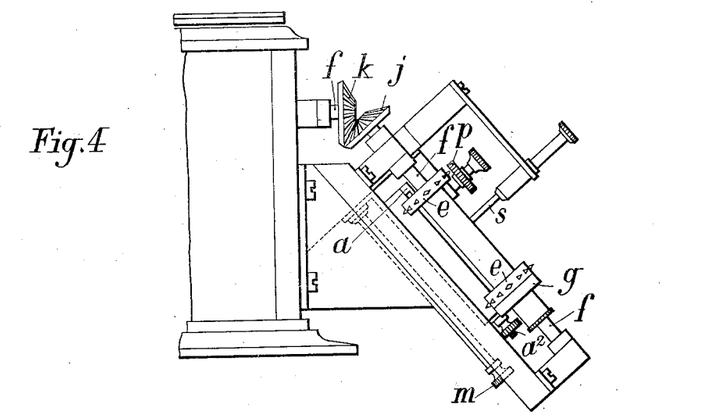
Figs. 4 and 5 respectively show a side and front view of a modification.
Figure 5:
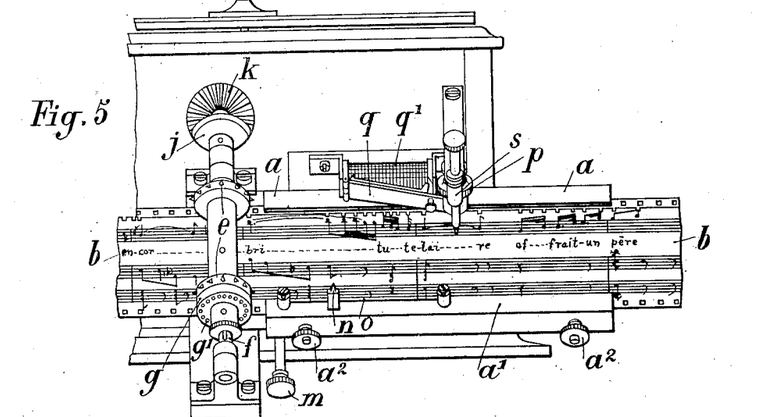

In order to facilitate the reading of the band, more especially when the latter is inscribed with the song and the accompaniment, the guide ($a$) may be inclined at a variable angle, as shown in Figs. 4 and 5; in this case the shaft would consist of two parts, connected together by beveled pinions ($j, k$).

In order to be able to easily disengage the indicating band ($b$) from the pin-wheel ($e$), the guide ($a$) can be turned slightly around the fixing screw ($l$), and is held in position at its other extremity by a set screw ($m$). The receiving reel ($d$) has imparted to it a rotary movement which can be controlled either by the pin-wheel ($e$) or by the clock-work of the apparatus. The side ($a'$) of the guide ($a$) is provided with a pointer ($n$) movable along a rod ($o$) so as to be brought in front of the desired spot of the indicating band. In order to produce this band, it is first necessary to inscribe the rhythm of the piece; with this object in view, the band actuated as has been described, is unwound, and by means of a style on the emission of each note or each syllable, a line is traced on this band and is prolonged during the whole period through which this note or syllable is sustained. This succession of lines, some long others short, constitutes a graphic indication of the rhythm of the piece.

In front of the starting point of each line, the corresponding notes or syllables are inscribed on the band, and beneath the same the corresponding notes of the accompaniment. For inscribing this graphic record the present arrangement may consist of a style ($p$), fitted to the armature ($q$) of an electro-magnet ($q'$) in the circuit of which a manipulator ($r$) is arranged. When the current is cut off from the electro-magnet ($q'$), the style ($p$) will be in its position of rest and will then inscribe on the band a straight line X—X. On each emission of notes or syllables the lever of the manipulator ($r$) will be pressed down, thereby closing the circuit of the electro-magnet ($q'$), the armature ($q$) of which will be attracted and the style ($p$) will first trace a small line approximately perpendicular to the line X—X; during the whole period during which the note or syllable is sustained the manipulator ($r$) is kept pressed down, and the style ($p$) will then trace on the band a line parallel to the line X—X, and the length of which will depend on the period of time that this note or syllable is sustained.

The tracing point of the style ($p$) may be mounted on an arrangement which permits of removing the band of paper whenever no line should be inscribed on the band.

Another auxiliary style ($s$) mounted on a spring and intended to be operated directly by hand, may be arranged in front of the style ($p$). This second style ($s$) may be utilized as a substitute for the style ($p$), or for marking on the band certain reference lines intended for example, in the case in which an error has been committed in recording the graphic record by means of the first style actuated electrically, to permit of immediately finding on the band the place where the error has been made. The rhythmic graphic record thus inscribed on the band may be preserved after the inscription of the music and words, or it may be rubbed out. The present apparatus will be provided or not with the arrangement for inscribing the rhythm, according to the purpose to which the apparatus is to be applied.

Figure 6:
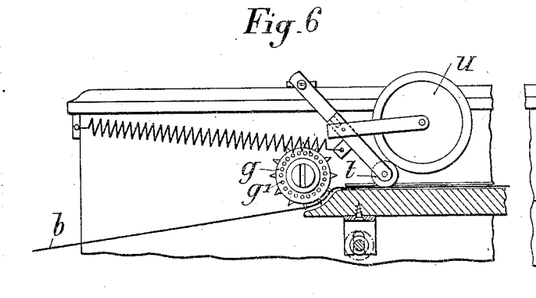
Figs. 6 to 8 show a front, plan and side view of the application of an arrangement for inscribing staves.
Figure 7:
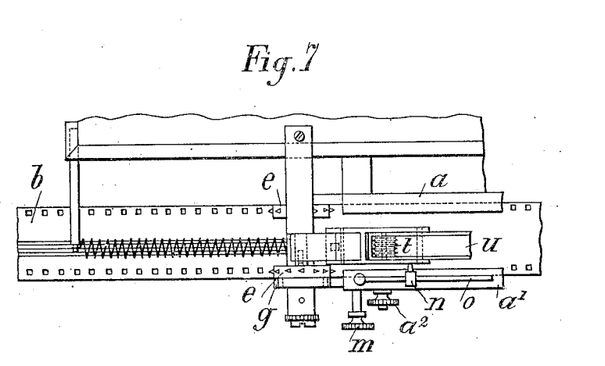

The apparatus for producing the band may furthermore consist of one or more printing disks ($t$), inked by roller ($u$) (Figs 6 to 8) and intended for the purpose of tracing the musical staff or staves on the band ($b$), while the latter is being rotated, and this is effected simultaneously with the inscription of the rhythmic graphic record.

Figure 9:
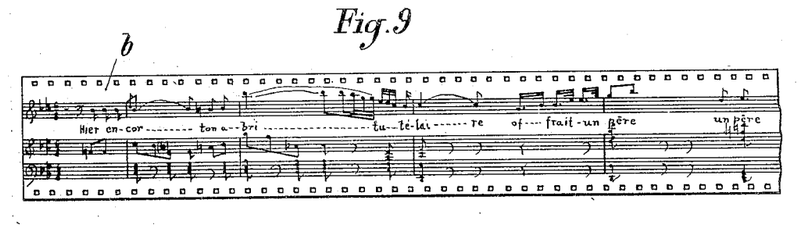
Fig. 9 shows a portion of a rhythmic band.

By means of the present arrangement of control as applied to a phonograph, and as described above, it is possible to execute one of the parts of a piece by the phonograph and the other portion can be executed by the person with absolute agreement of the two parts. For example, the band ($b$) formed as shown in Fig. 9, and passing along in front of the pointer ($n$) permits an accompanist (pianist or the like) to follow the song performed by the phonograph, inasmuch as the accompanist is always forewarned by the inscriptions of the band ($b$) in front of the pointer ($n$) of the exact moment in which the notes or syllables forming the song will be emitted by the phonograph. The present indicating arrangement also permits of a singer being accompanied by a phonograph.

Figure 10:
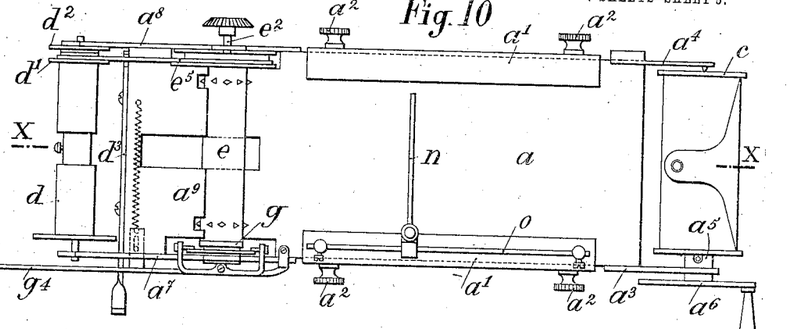
Fig. 10 shows a modification of the arrangement of the desk.
Figure 11:
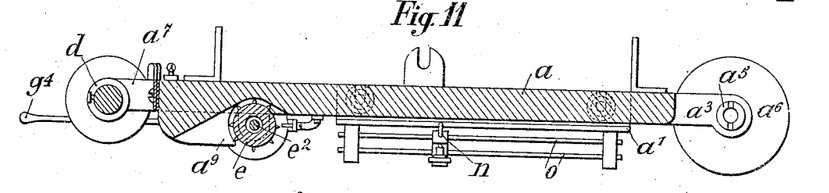
Fig. 11 is a longitudinal section on the line X—X of Fig. 10.

In the modification shown in Figs. 10 and 11, the apparatus assumes the form of a desk, and consists of a board ($a$) mounted at an angle on a support fitted to one of the sides of the box of the phonograph. Two guides ($a'$) are fitted to the longitudinal edges of this board by means of set screws ($a^2$) and serve to guide the band ($b$) on which is inscribed, or on which has to be inscribed, the rhythmic graphic record and the signs or indications corresponding to the sounds emitted by the phonograph. The part ($a$) is provided at one of its extremities with two lugs ($a^3$, $a^4$) between which is engaged the stock wheel ($c$); the spindle ($a^5$) of a crank disk ($a^6$) turns freely in one of these lugs ($a^4$); a slot is provided in this spindle and engages with a pin or projection provided on one of the sides of the reel ($c$). The other side of the latter is provided in its center with a small recess in which can engage a point arranged on the end of the lug ($a^3$); this latter is elastic so as to permit of an easy and rapid insertion and removal of the reel ($c$). At its other end the part ($a$) is provided with two other lugs ($a^7$, $a^8$), between which are mounted the pin-wheel ($e$) and the receiving wheel ($d$); in order to increase the contact surface of the band with the pin-wheel ($e$) a boss ($a^9$) is formed at the back end of the part ($a$). The pin-wheel ($e$) is mounted loose on a shaft ($e^2$) (Fig. 14) mechanically connected to the clock-work of the phonograph as described farther on, and is connected up to this shaft by coupling disk ($g$), which is constantly carried around on the rotation of the shaft ($e^2$) and can be moved longitudinally along the latter. On the interior surface of the coupling disk ($g$), slots or holes ($g'$) are provided and are for the purpose of meshing with one or more pins ($e'$) provided on the pin-wheel ($e$); an interior spring ($g^2$) tends to maintain the coupling ($g$) constantly engaged with the pin-wheel ($e$).

Now, in order that the coupling can be maintained in the disengaged position, the shaft ($e^2$) is provided with a bayonet groove ($e^3$, $e^4$) in which can be displaced a pin ($g^3$) provided on the coupling ($g$). The coupling ($g$) can be disengaged by hand or by the intermediation of a manipulating lever ($g^4$).

The reel ($d$) is rotated by the pin-wheel ($e$) by the intermediation of a transmission cord or belt ($e^5$), which latter is preferably elastic.

Now, in order to establish or interrupt the mechanical connection between the pin-wheel ($e$) and the receiving wheel ($d$), this latter may be provided at its extremity with two pulleys, the one ($d'$) of which fixed to the reel and the other ($d^2$) turning loose; the displacement of the transmission cord or belt from the fixed to the loose pulley, or vice versa, can be effected by means of a disengaging bar ($d^3$) fitted to the part ($a$).

Figure 15:
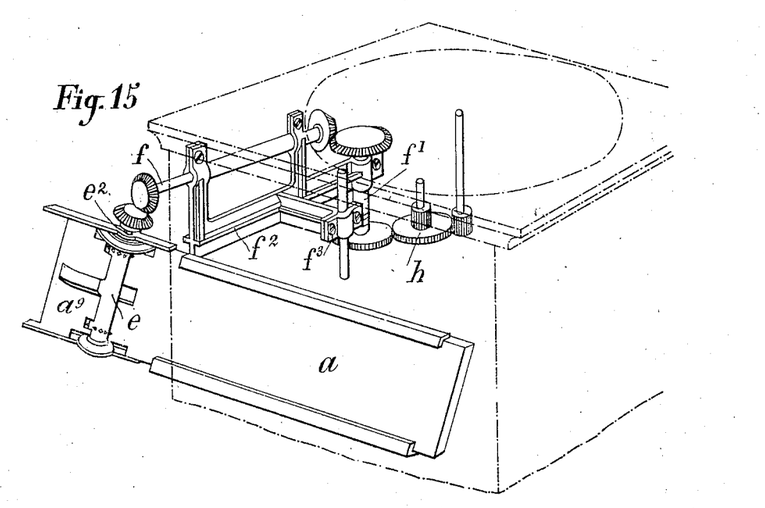
Fig. 15 is a perspective view of the mechanism actuating this roller.

The shaft ($e^2$) is rotated by the cog-wheel ($h$) of the mechanism of the phonograph by the intermediation of two shafts ($f'$) and ($f$) (Fig. 15); these two shafts are carried in a framework ($f^2$) provided with a collar ($f^3$) fitted to one of the columns or pillars of the clock-work of the phonograph. The present arrangement can consequently be applied to all existing phonographs. When the apparatus is utilized for causing a band to be unwound synchronously with the emissions of the phonograph, one of the slides of the guides is provided with a rod ($o$) along which an indicator or pointer ($n$) can be moved; at the moment the first sound is emitted by the phonograph, this pointer ($n$) will be brought in front of the first inscription of the band.

Figures 12, 13, 14:
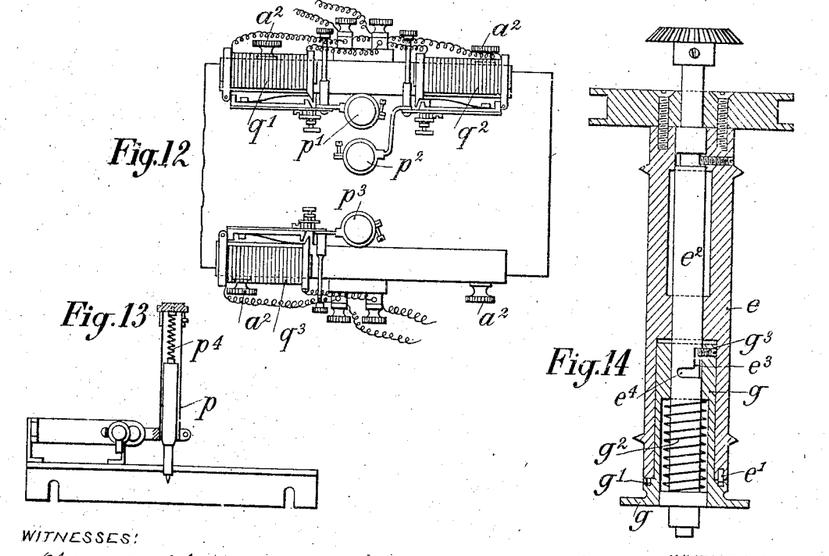
Fig. 12 shows a portion of this desk with inscribing styles.
Fig. 13 is a detailed view showing one of these styles.
Fig. 14 is a detailed view, on a larger scale, showing a longitudinal section of the actuating roller of the desk shown in Fig. 10.

For the case in which the apparatus is employed for inscribing the indicating band, the guides ($a'$) are provided with one, two, or more electric styles (Fig. 12); for example, on the upper guide are mounted two styles ($p'$) ($p^2$), and on the lower guide a style ($p^3$). Each of these styles is formed by a pencil holder ($p$), the lead of which is constantly held in contact with the band by the action of the spring ($p^4$) (Fig. 13). These pencil holders are respectively fitted to the armature of the electro-magnets ($q'$, $q^2$, $q^3$); the two electro-magnets ($q'$, $q^2$) of the two upper styles are arranged in the same circuit and are actuated by the same manipulator ($r$), these two styles will trace two identical graphic records on the band; the use of these two styles is a precautionary measure for the case in which one of them for any reason whatsoever might fail to act. These two upper styles are for the purpose of tracing the rhythmic graphic record. The lower style is arranged in a separate circuit and is controlled by a second manipulator ($r'$). This lower style is for the purpose of marking on the band certain indicating signs, reference marks and the like.

Figure 16:
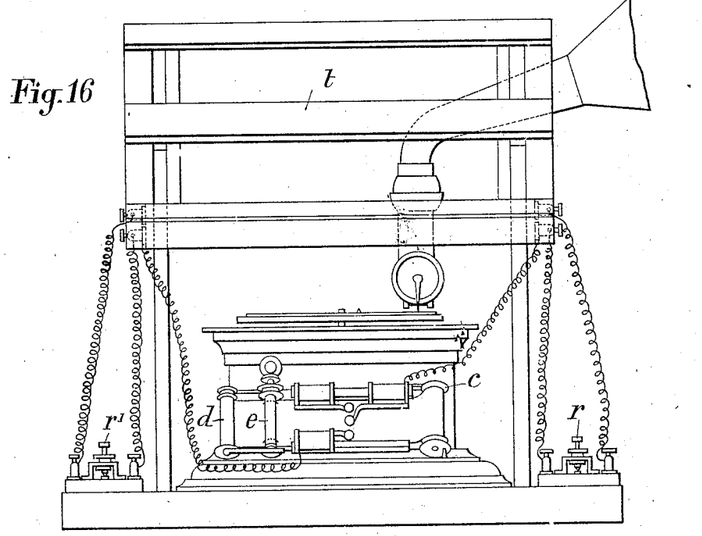
Fig. 16 is an elevation showing this desk fitted to a phonograph and provided with its electrical actuating mechanism.
Figure 17:
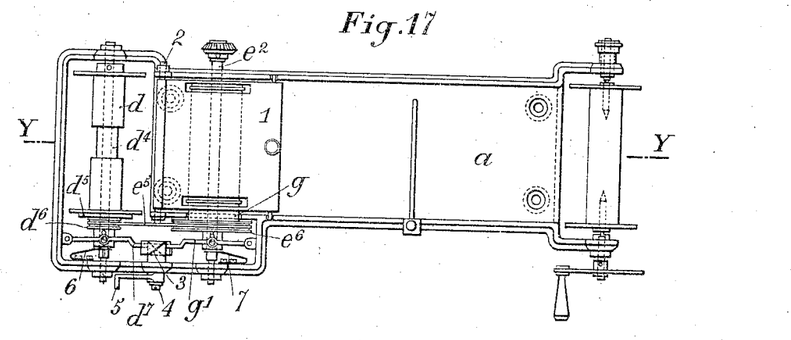
Figure 18:
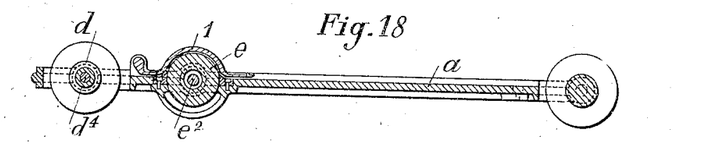
Figure 19:
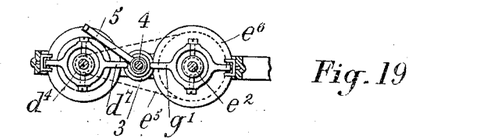

The two manipulators may be arranged as shown in Fig. 16 on the right and on the left of the phonograph so that the operator can operate the manipulator ($r$) with the right hand and ($r'$) with the left hand, while at the same time following the band as it is unwound on the board ($a$). If at a certain moment it is necessary to stop the movement of the band, the operator will only have to act on the lever ($g^4$) in order to disconnect the coupling.

If it is desired to maintain the coupling disk connected while the phonograph continues working, the coupling ($g$) will be turned slightly from right to left by hand, whereby its spring ($g^8$) will be drawn back and engage in the part ($e^4$) of the groove of the shaft ($e^2$). When it is desired to start the band again, the coupling will be turned in the inverse direction, so as to bring the pin ($g^3$) into the part ($e^3$) of the groove; the coupling ($g$) under the action of the spring ($g^2$) will then reëngage with the pin-wheel ($e$).

The whole of the arrangement can be completed by a desk ($t$) for the purpose of receiving, for example, the score containing the piece sung by the phonograph when it is desired to control the piece inscribed on the score and the inscription of the rhythmic band.

In the modification shown in Figs. 17 to 21, the pin-wheel ($e$) is covered over by cap or case I which can turn around its pivots 2; this cap is for the purpose of maintaining the rhythmic band ($b$) in contact with the upper part of the pin-wheel ($e$); this arrangement permits at the commencement of an operation of more easily placing the band ($b$) in position, inasmuch as it suffices to raise the cap I, to place the free end of the band on the upper part of the wheel ($e$) and to push down the cap I again. This modification, furthermore, comprises a special device for actuating the engaging and disengaging gear of the pin-wheel ($e$), and of the receiving reel ($d$). This arrangement is combined so as simultaneously to control the engaging or the disengaging of the said pin-wheel and the reel so as to avoid the possibility of any wrong manipulation.

The pin-wheel ($e$) and the receiving reel ($d$) are both mounted loose on their respective spindles ($e^2$, $d^4$), and are rotated by two couplings ($g$, $d^5$). These latter are respectively fixed to two pulleys ($e^6$, $d^6$), connected together by transmission belt or cable ($e^5$). The coupling ($g$) is firmly attached to the shaft ($e^2$) as regards the rotary movement, but can be freely displaced longitudinally along this shaft. The coupling ($d^5$) is altogether loose on its shaft or spindle ($d^4$).

Figure 21:
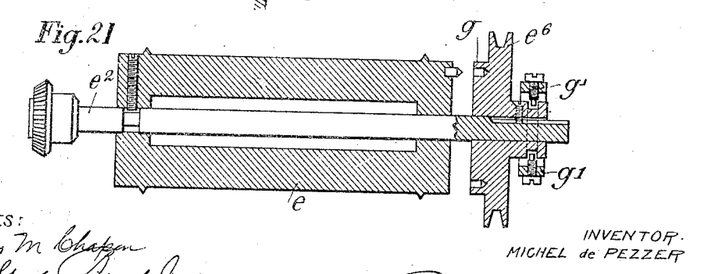
Fig. 21 is a detail showing on a larger scale a longitudinal section of the actuating roller.

The two couplings ($g$), ($d^5$), are provided with holes or recesses on their inner surface which are intended for engaging with one or more pins or projections provided on the pin-wheel ($e$) and the reel ($d$) as shown in Fig. 21. The displacements of the two couplings ($g$, $d^5$) are controlled by levers ($g'$, $d^7$), and these latter are actuated simultaneously by a single cam 3 keyed to a spindle 4 provided with a manipulating lever 5. According as the latter is moved in one or the other direction, so will the couplings ($g$, $d^5$) be moved forward or drawn back on their respective spindles and will thus occasion the connecting up or disconnection of the pin-wheel ($e$) and the reel ($d$).

Springs 6, 7 constantly tend to maintain the couplings ($g$, $d^5$) in connection with the pin wheel ($e$) and the receiving reel ($d$).

Figure 20:
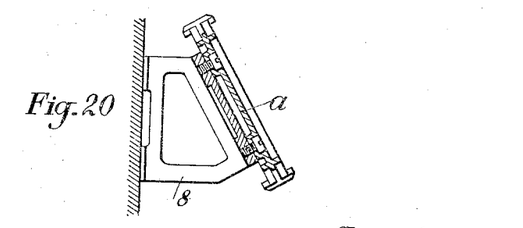

Fig. 20 shows the method of mounting the desk ($a$) on a support 8 of special shape fitted to the wall of the box of the phonograph.

The present system of rhythmic inscription is capable of numerous applications.

The present apparatus can be advantageously employed for recording phonographic disks.

At present when an artist sings or speaks in front of a phonograph for the purpose of recording a piece, he is constantly preoccupied with the necessity of terminating his piece within the required time, and if the recording of the piece has not been finished at the moment in which the recording style has reached the end of its course on the disk or cylinder the latter will be of no use, and the artist will have to recommence his piece; but, inasmuch as, in order to obtain a sharp inscription on the disk, it is necessary to sing or speak out very loud, the result will be very tiring. The present system of rhythmic indicator does away with this inconvenience. Before performing a piece out aloud the artist first sings it softly while the phonograph or the registering apparatus turns without disk or cylinder, while at the same time rotating a band on which the operator traces the rhythmic graphic record of the song to be recorded by scanning on the manipulator the syllables of his song. If the piece is performed within the required time, the syllables may then be inscribed on the band in front of the corresponding lines of the graphic record; while if, on the contrary, the piece has not been terminated within the required time, the artist will have to begin again, but this fresh performance of the piece will not tire him because, as has been stated, he is only singing softly, without effort and consequently without fatigue.

When the rhythmic graphic record of the piece performed has been obtained within the required time, the wax disk is placed on the phonograph, and the band inscribed with the graphic record is introduced into the apparatus. The phonograph is then started, and the artist performs the piece at the top of his voice; as the band is unwound at the same speed as during its inscription, he has no longer to worry himself about the time allotted to him, only having to sing according to the inscriptions of the band passing in front of his eyes.

The present apparatus may also be used for any kind of instruction, because the agreement which it supplies between the signs read and the sounds heard produces in the brain an intimate correlation between these signs and these sounds and by frequent repetition this correlation can be fixed in the mind.

The present apparatus can be used for the instruction of languages; thus, the phonograph might pronounce a series of foreign words, and the band would present to the eyes of the auditor either their translation or their spelling; the agreement of the inscriptions of the band and of the words pronounced by the phonograph would also be obtained by means of a graphic inscription, as described above. By this method of teaching, the auditor would be rapidly familiarized with the signification of the words or with their pronunciation.

In the case in which the indicating band has to be read by several persons at one and the same time, the apparatus will be of larger dimensions and the band will be exposed at a suitable height above the ground. With the present indicating apparatus mechanical pianos or organs may be employed for accompanying a piece performed by an artist or by a phonograph.

As previously described, a rhythmic graphic record of the piece would be first inscribed; then according to this graphic record will be determined the position of the perforations of the cards or rolls of these mechanical pianos or organs so as to establish the agreement between the accompaniment and the song; it will then suffice mechanically to connect the actuating mechanism of the rolls of the mechanical piano or organ with that of the phonograph, or the actuating device of a rhythmic band in accordance with that which has served to manufacture these rolls, in order to obtain synchronism between the accompaniment executed by the mechanical piano or organ and the piece sung by the phonograph or artist. In the case in which the piece is performed by an artist, it suffices for the latter to sing, speak or play while following the passage of the rhythmic band.

The present indicating apparatus may also be applied for synchronizing the movement of a kinematograph with those of a phonograph in the following manner. The artist will be kinematographed or photographed kinematographically while singing softly during which time a rhythmic graphic of this song will be inscribed on the band. This band is then unwound in the apparatus at the same speed, and the artist sings out loud before the phonograph while following the inscriptions of the band passing along in front of him.

It is to be understood that the term "phonograph" as hereinafter used in the claims is sufficiently broad to include equivalent apparatus of other names, the nature of which apparatus has been pointed out elsewhere in this specification. It is clear also that the present indicating apparatus for recording the rhythm is capable of numerous other applications, and that the shape, dimensions and arrangement of detail may vary according to the applications.

Having now particularly described and ascertained the nature of my said invention, and in what manner the same is to be performed, I declare that what I claim is:

1. In a sound producing device, a movable support for a sound producing record, a band run in synchronism with said support, and electrically controlled means for impressing on said band, a graphic record for indicating rhythm.

2. In a phonograph, a movable support for a sound producing record, a band run synchronously therewith, and electro-magnetically controlled means for impressing on said band a graphic record for indicating rhythm.

3. In a phonograph, a movable support for a sound producing record, a band run synchronously therewith, and key controlled electro-magnetic means for impressing on said band, a graphic record for indicating rhythm.

4. The combination of a phonograph having a driving mechanism, of a movable member driven from said driving mechanism and having a surface adapted to receive a graphic record, electrically controlled means for impressing a graphic record upon said surface including a marker laterally movable with respect to said surface, and a manually operable member for controlling said electrically controlled means, the length of the graphs depending upon the rate of movement of the movable member and the successive operation of said manually operable member.

In testimony whereof I affix my signature in presence of two witnesses.

MICHEL de PEZZER.

Witnesses:
HENRY DANZER,
LUCIEN CRESPIN.